(12) United States Patent
Kim

(10) Patent No.: US 8,427,427 B2
(45) Date of Patent: Apr. 23, 2013

(54) DISABLING AN AUTOMATIC ROTATION FUNCTION OF MOBILE COMPUTING DEVICES

(75) Inventor: Seungil Kim, Seoul (KR)

(73) Assignee: Empire Technology Development LLC, Wilmington, DE (US)

(*) Notice: Subject to any disclaimer, the term of this patent is extended or adjusted under 35 U.S.C. 154(b) by 203 days.

(21) Appl. No.: 13/123,450

(22) PCT Filed: Dec. 13, 2010

(86) PCT No.: PCT/US2010/060125
§ 371 (c)(1),
(2), (4) Date: Apr. 8, 2011

(87) PCT Pub. No.: WO2012/082104
PCT Pub. Date: Jun. 21, 2012

(65) Prior Publication Data
US 2012/0147047 A1 Jun. 14, 2012

(51) Int. Cl.
*G06F 3/033* (2006.01)
*G09G 5/08* (2006.01)
*G09G 5/00* (2006.01)

(52) U.S. Cl.
USPC ............ 345/158; 345/649; 345/656; 345/659

(58) Field of Classification Search .................. None
See application file for complete search history.

(56) References Cited

U.S. PATENT DOCUMENTS

| | | | |
|---|---|---|---|
| 2005/0212757 A1 | 9/2005 | Marvit et al. | |
| 2008/0306707 A1* | 12/2008 | Vock et al. | 702/141 |
| 2009/0195497 A1* | 8/2009 | Fitzgerald et al. | 345/156 |
| 2010/0066763 A1* | 3/2010 | MacDougall et al. | 345/656 |
| 2010/0088639 A1 | 4/2010 | Yach et al. | |
| 2010/0214216 A1* | 8/2010 | Nasiri et al. | 345/158 |
| 2011/0063216 A1* | 3/2011 | Orr et al. | 345/158 |
| 2011/0175805 A1* | 7/2011 | Rottler et al. | 345/156 |
| 2012/0026098 A1* | 2/2012 | Ladouceur et al. | 345/173 |

OTHER PUBLICATIONS

"solsie.com," accessed on May 9, 2012 at http://web.archive.org/web/20091231125045/http://solsie.com/, 6 pages.
B., Sierra Monica. Wrap 920AV Brings 3D Viewing to the Vuzix iWear Video Glasses Line. Jan. 6, 2009, 3 pages.
George, Saijo. Screen Rotator.Net—manual screen rotation utility for windows mobile. Nov. 6, 2008. 1 page.
International Search Report and Written Opinion; International Application No. PCT/US10/60125; filed Dec. 13, 2010; Applicant: Empire Technology Development LLC; Mailed Feb. 17, 2011; 7 pages.
Lopes, et al. Nude Detection in Video Using Bag-of-Visual-Features. Computer Graphics and Image Processing (SIBGRAPI), 2009, XXII Brazilian Symposium. Issued on Oct. 11-15, 2009, pp. 224-231.

(Continued)

*Primary Examiner* — Ke Xiao
*Assistant Examiner* — Donna Ricks
(74) *Attorney, Agent, or Firm* — Perkins Coie LLP

(57) ABSTRACT

Technology is generally described for disabling an automatic rotation function of mobile computing devices. The technology can detect a tilt angle of a display of the computing device in relation to a surface; and if the tilt angle is less than a specified threshold tilt angle, disable a rotation function.

10 Claims, 8 Drawing Sheets

OTHER PUBLICATIONS

Ni, et al. Epitomic Location Recognition. IEE Transactions on Pattern Analysis and Machine Intelligence, 2009. 10 pages.

Shazam—Song Recognition App for the iPhone [i Phone Apps Review]. Posted by iPhoneHacks on Jul. 27, 2008 in iPhone Applications: iPhone Apps, Jailbreak Apps, iPhone Web Apps, iPhone Apps Review. 7 pages.

Sorrel, Charlie. iPad Gets New Button: Screen Rotation Lock. Mar. 12, 2010. 4 pages.

Yuriy, Chesnokov. Ultra Rapid Object Detection in Computer Vision Applications with Haar-like.Wavelet Features. Jul. 9, 2008. 32 pages.

* cited by examiner

DISABLING AN AUTOMATIC ROTATION FUNCTION OF MOBILE COMPUTING DEVICES

CROSS REFERENCE TO RELATED APPLICATION(S)

This application is a national stage application of commonly assigned International Application No. PCT/US10/60125, filed Dec. 13, 2010.

BACKGROUND

Various mobile computing devices ("mobile devices") automatically rotate information they display, e.g., when the mobile devices detect that the user may be viewing the display in a rotated orientation. As examples, the APPLE® IPHONE® and IPAD® mobile devices rotate displayed information automatically when the user rotates the mobile device. Other examples of mobile computing devices with rotation functions are digital cameras, "smartphones," tablet computers, etc. When a user rotates the mobile device from a vertical or "portrait" orientation to a horizontal or "landscape" orientation, the computing device automatically rotates the displayed information so that the information remains in the same orientation it was in before the user rotated the mobile device. As an example, if the displayed information included the text "ABC123" in a normal reading orientation (see FIG. 1A) before the user rotated the computing device, and then the user rotated the display device by approximately 90 degrees, the mobile device can rotate the text by 90 degrees so that the displayed text remains in the normal reading orientation. (See FIG. 1C.)

Mobile devices employ one or more sensors to detect orientation with respect to a plane (e.g., earth's surface) or force of gravity and rotate the information so that the "top" of the displayed information is farther from the plane than the "bottom" of the information. Examples of sensors that mobile devices employ to detect their tilt angle are accelerometers and gyroscopic sensors.

This automatic rotation function is useful when the user views the display while standing, sitting, or lying in a prone position (i.e., face down). When the user is lying in a supine position (i.e., face up), however, the rotation function is sometimes dysfunctional. When a user is in the supine position, the computing device can rotate the displayed information at undesirable times. To prevent this behavior, some computing devices include a switch (see, e.g., switch 104 in FIG. 1A) to disable the rotation function.

SUMMARY

In various embodiments, the technology implements a method performed by a computing device having a processor and memory, including: detecting a tilt angle of a display of the computing device in relation to a surface; and if the tilt angle is less than a specified threshold tilt angle, disabling a rotation function.

In various embodiments, the technology includes a computer-readable storage device storing computer-executable instructions, the instructions including: detecting a tilt angle of a display of a computing device in relation to a plane; and if the tilt angle is less than a specified threshold tilt angle, disabling a rotation function.

In various embodiments, the technology includes a system for detecting whether to disable a rotation function of a computing device having a processor, memory, and a display, including: a sensor configured to detect a tilt angle of a display surface in relation to a plane; and a component configured to disable a rotation function of the computing device if a difference between the tilt angle and a specified threshold tilt angle exceeds a specified value.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Technology is described for automatically disabling a rotation function of mobile devices ("the technology"). In various embodiments, when the technology determines that the angle between a display of the computing device and a plane (e.g., earth's surface) is less than or equal to a specified threshold tilt angle (e.g., 90 degrees), the technology can disable the rotation function. The technology can receive the tilt angle, e.g., by receiving and interpreting a signal from a sensor. Examples of sensors are accelerometers and gyroscopic sensors. Other sensors that can assist in identifying a tilt angle can also be employed. The technology can then compute a tilt angle of a display of the mobile device. As an example, the technology may compute the angle between the display and a plane, e.g., the surface of the earth. If the tilt angle is less than a specified threshold (e.g., less than or equal to 90 degrees), the technology may disable the rotation function (or "rotation feature") of the mobile device. Otherwise, the rotation function may operate as it normally would. When the angle between the display and a surface (e.g., earth's surface) is less than a specified threshold tilt angle, the technology may conclude that the user of the computing device is viewing the mobile device while in a supine position. Users generally find it convenient to view the display by tilting the display so that it is roughly parallel to the user's face or at least has an acute angle in comparison to the face generally. When the user is sitting, standing, or lying in a prone position, the angle between the display and the earth's surface will generally be obtuse (greater than 90 degrees). On the other hand, when the user is lying in a supine position, the angle between the display and the earth's surface will generally be acute. Thus, by computing the angle between the display and a plane, the technology can determine whether the display is being viewed while the user is in a supine position.

Figure 1A:
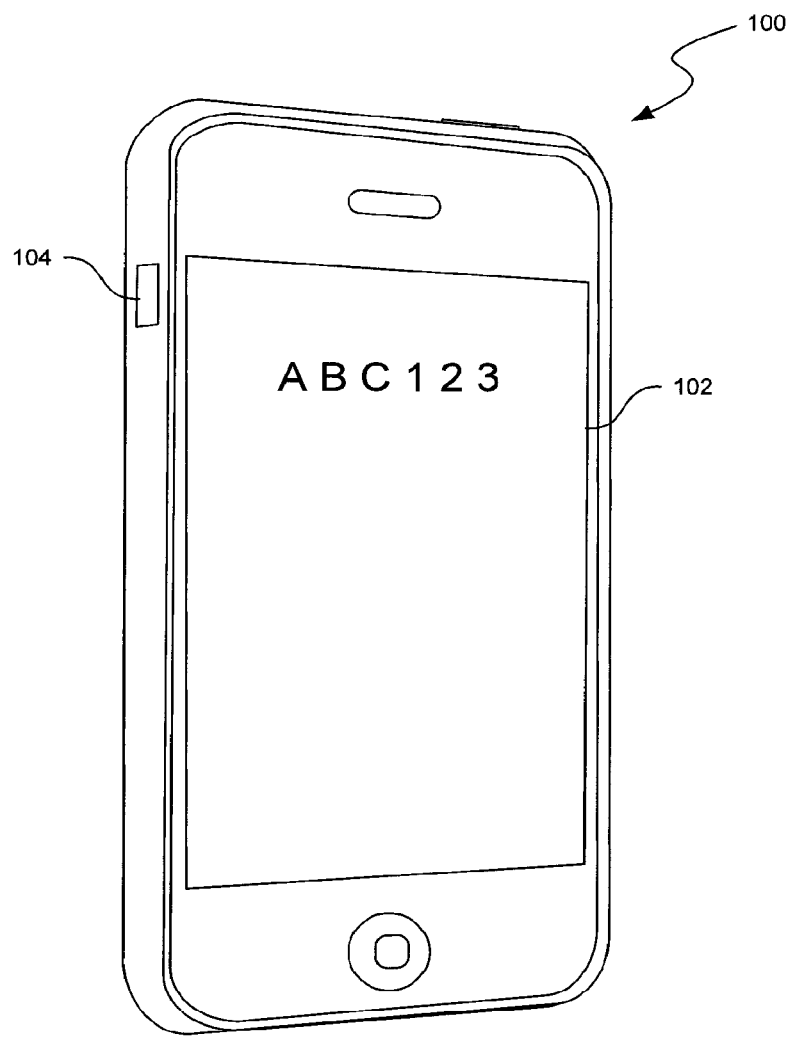
FIGS. 1A-1C illustrate mobile devices in various orientations.
Figure 1B:
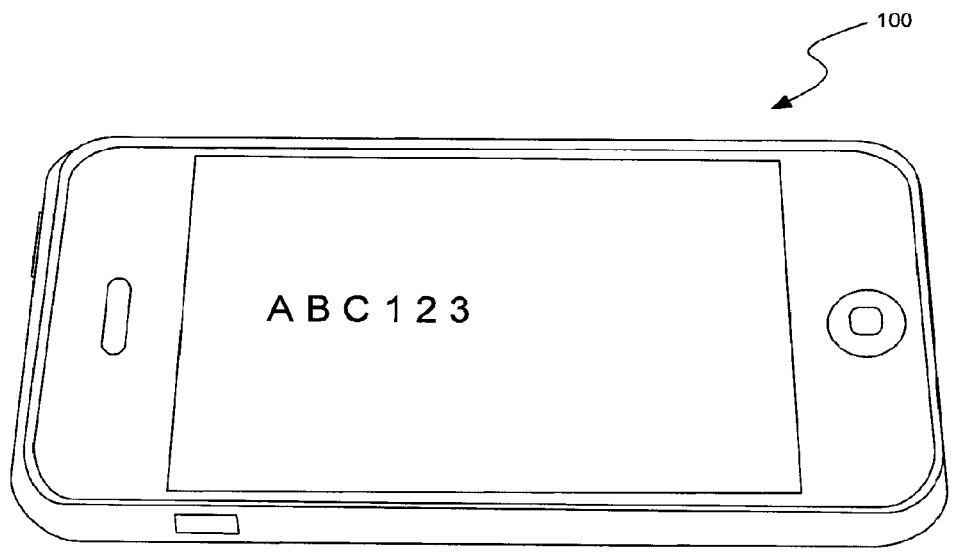
Figure 1C:
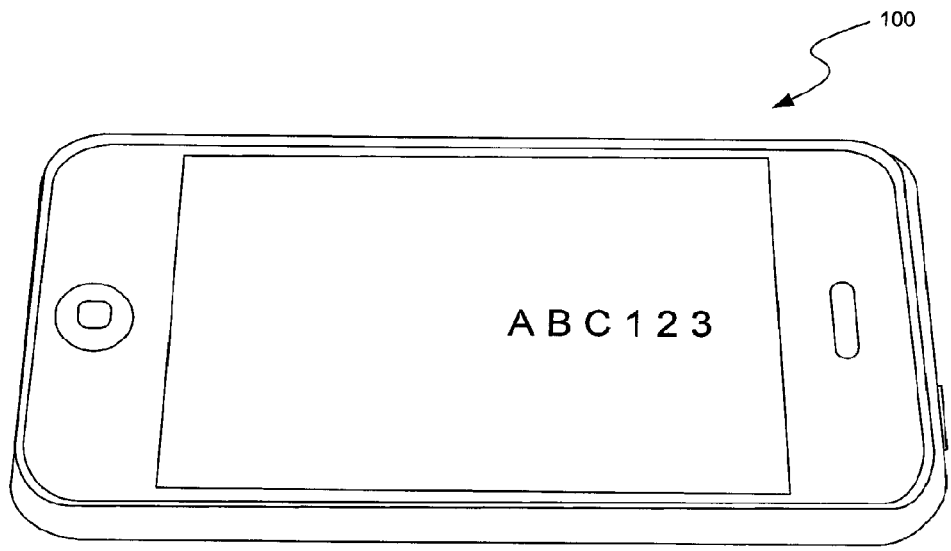

FIGS. 1A-1C illustrate mobile devices in various orientations. In FIG. 1A, a mobile device 100 appears in a portrait or vertical orientation. The mobile device includes a display 102 and a rotation switch 104. In some embodiments, a user may be able to specify that the technology is to be enabled or disabled, e.g., by using the rotation switch 104. When the technology is disabled, the rotation function may operate as it normally would—even when the tilt angle is less than the specified threshold tilt angle. In FIGS. 1B and 1C, the mobile device 100 appears in landscape or horizontal orientations. As is illustrated in FIGS. 1B and 1C in comparison to FIG. 1A, when a user rotates the mobile device 100, a rotation function of the mobile device can rotate the information displayed on the display 102 to facilitate viewing by the user.

Figure 2:
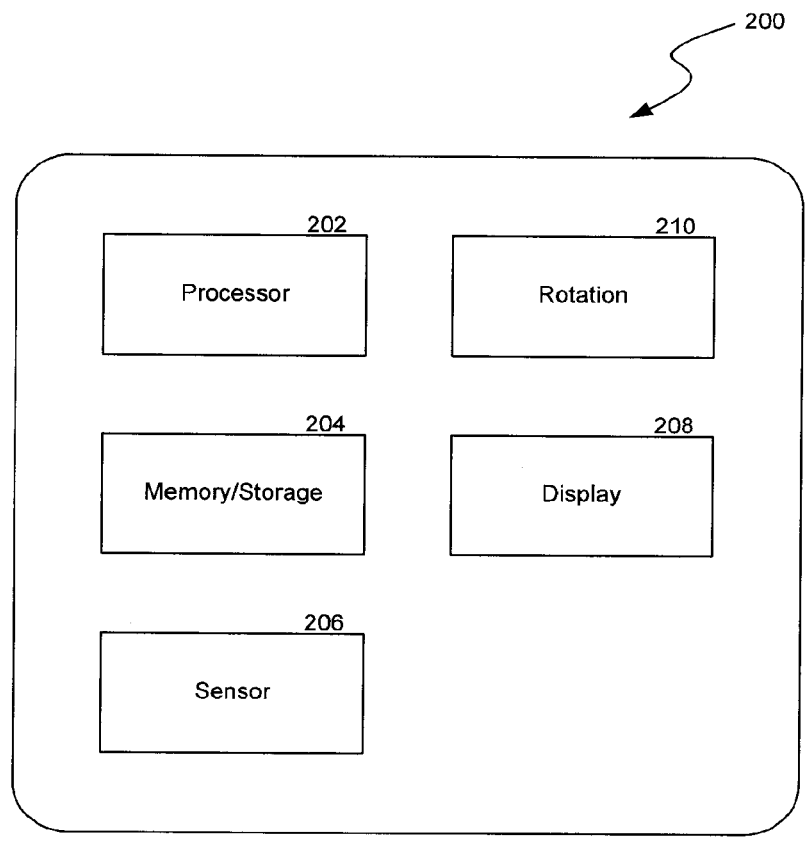
FIG. 2 is a block diagram of an illustrative embodiment of components of the technology for automatically disabling a rotation function of mobile devices.

FIG. 2 is a block diagram of an illustrative embodiment of components of the technology for automatically disabling a rotation function of mobile devices. A mobile device may include various components 200 that implement the disclosed technology. As examples, a mobile device may include a processor 202, a memory and/or other storage 204, and a display 208. The mobile device can also include a sensor 206. Examples of sensors that mobile devices employ to detect their tilt angle are accelerometers and gyroscopic sensors. In various embodiments, the sensors can provide an indication of an angle between the mobile device (e.g., the display 208 of the mobile device) and a reference plane (e.g., surface of the earth) or a force of gravity. The mobile device can also include a rotation component 210. In various embodiments, the rotation component 210 can include a rotation function that determines whether to rotate information displayed on display 102 (illustrated in FIG. 1A) and invokes a rotation function to actually rotate the displayed information. In various embodiments, mobile devices can include none, one, or more of these components 200.

Figure 3:
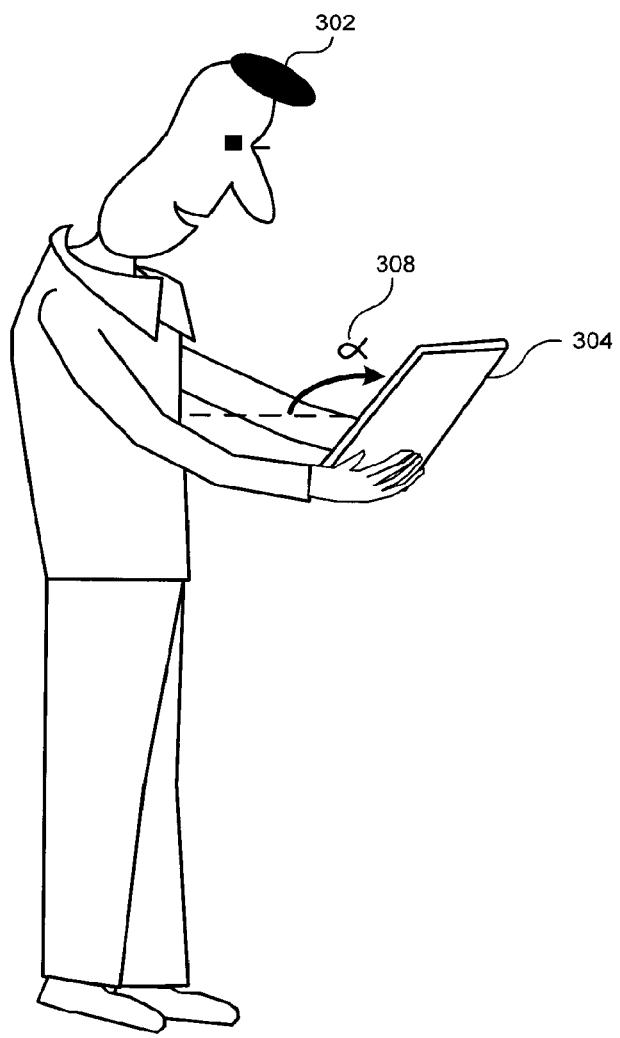
FIG. 3 illustrates use of a mobile device when a user is in a standing position.

FIG. 3 illustrates use of a mobile device when a user is in a standing position. In the illustration, a user 302 is using a mobile device 304 while standing on a surface 306. The angle formed between the display of the mobile device 304 and the surface on which the user is standing is an obtuse angle α ("alpha") 308.

Figure 4:
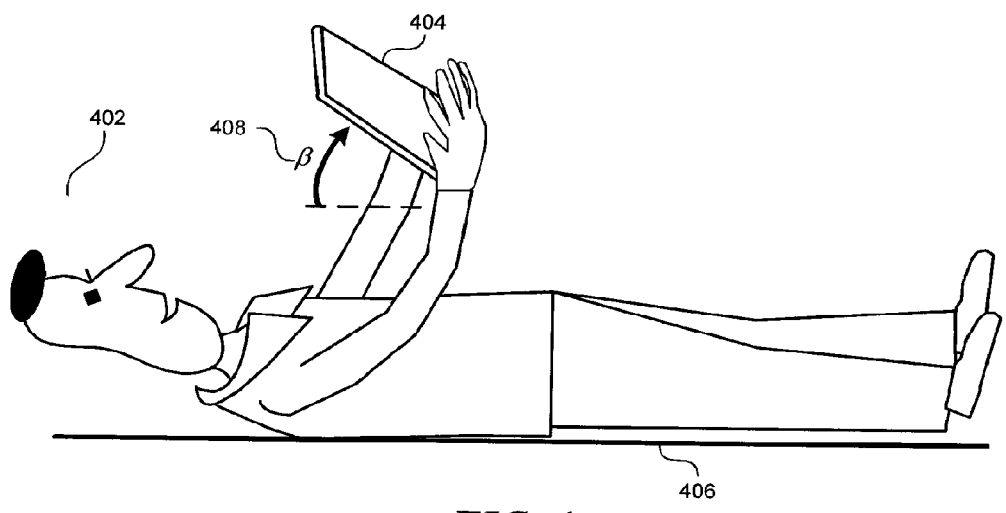
FIG. 4 illustrates use of a mobile device when a user is in a supine position.

FIG. 4 illustrates use of a mobile device when a user is in a supine position. In the illustration, a user 402 is using a mobile device 404 while lying down on surface 406 in a supine position. The angle formed between the display of the mobile device 404 and the surface on which the user is lying down is an acute angle β ("beta") 408.

Figure 5:
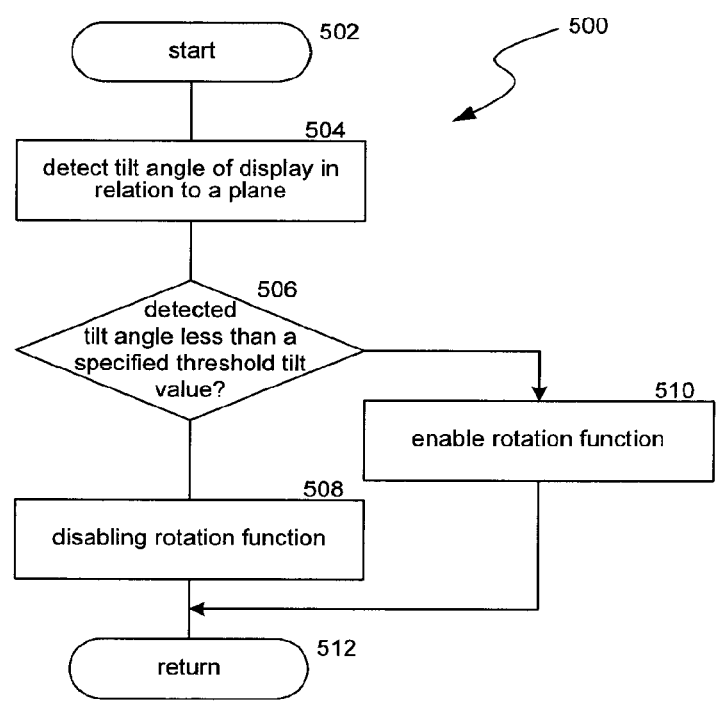
FIG. 5 is a flow diagram of an illustrative embodiment of a routine invoked by the technology to determine whether to disable the rotation function.

FIG. 5 is a flow diagram of an illustrative embodiment of a routine 500 invoked by the technology to determine whether to disable the rotation function. The routine 500 begins at block 502. At block 504, the routine detects a tilt angle of the display of the mobile device in relation to a plane. As an example, the routine may detect the tilt angle between the surface of the earth and the display of the mobile device. In embodiments in which the sensor provides an angle in relation to the force of gravity, the routine may compute the tilt angle by assuming that the surface is orthogonal to the force of gravity and below the mobile device. At decision block 506, the routine determines whether the detected tilt angle is less than a specified threshold tilt value. If the detected tilt angle is less than the specified threshold tilt value, the routine continues at block 508 otherwise, the routine continues at block 510. As an example, when the detected tilt angle is less than approximately 90°, the routine may determine that the mobile device is being used while the user is in a supine position and so the rotation function should be disabled. In various embodiments, the specified threshold tilt value can vary. In various embodiments, the routine may instead determine at decision block 506 whether the detected tilt angle is less than or equal to the specified threshold tilt value. At block 508, because the routine has determined that the user is viewing the mobile device while in a supine position, the routine disables the rotation function. At block 510, because the routine has determined that the user is viewing the mobile device while not in a supine position, the routine enables the rotation function. The routine then returns at block 512.

In various embodiments, the logic can flow as follows: block 502; followed by block 504; followed by decision block 506, which branches to block 510 if the condition is false or to block 508 if the condition is true. Thereafter, the logic flows from both blocks 508 and 510 to block 512.

Those skilled in the art will appreciate that the logic illustrated in FIG. 5 and described above, and in each of the flow diagrams discussed below, may be altered in a variety of ways. For example, the order of the logic may be rearranged, sublogic may be performed in parallel, illustrated logic may be omitted, other logic may be included, etc.

Figure 6:
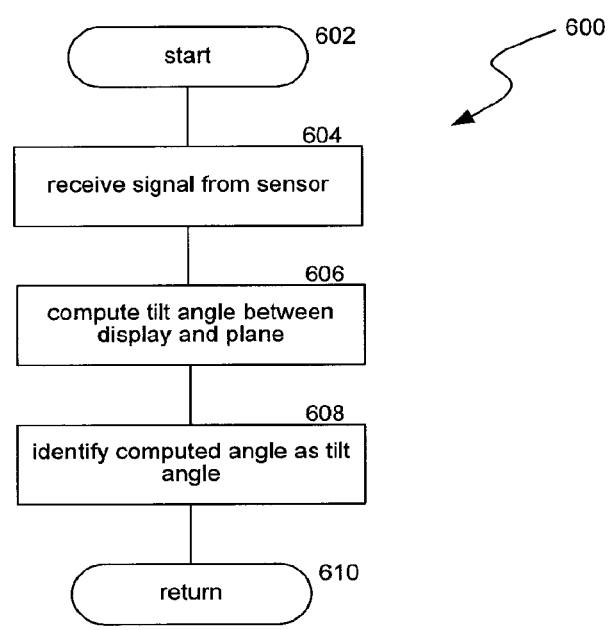
FIG. 6 is a flow diagram of an illustrative embodiment of a routine invoked by the technology to compute the tilt angle of the display in relation to a plane.

FIG. 6 is a flow diagram of an illustrative embodiment of a routine 600 invoked by the technology to compute the tilt angle of the display in relation to a plane. The routine 600 begins at block 602. At block 604, the routine receives a signal from a sensor. The sensor can generate the signal when it detects motion or tilt of the mobile device, e.g., in relation to a plane. At block 606, the routine computes the tilt angle between the display of the mobile device and a specified plane, e.g. the surface of the Earth. At block 608, the routine identifies the previously computed angle as the tilt angle. Other routines may employ this tilt angle to determine whether or not to enable or disable the rotation function. At block 610, the routine returns.

In various embodiments, the logic can flow as follows: block 602; followed by block 604; followed by block 606; followed by block 608; and followed by block 610.

Figure 7:
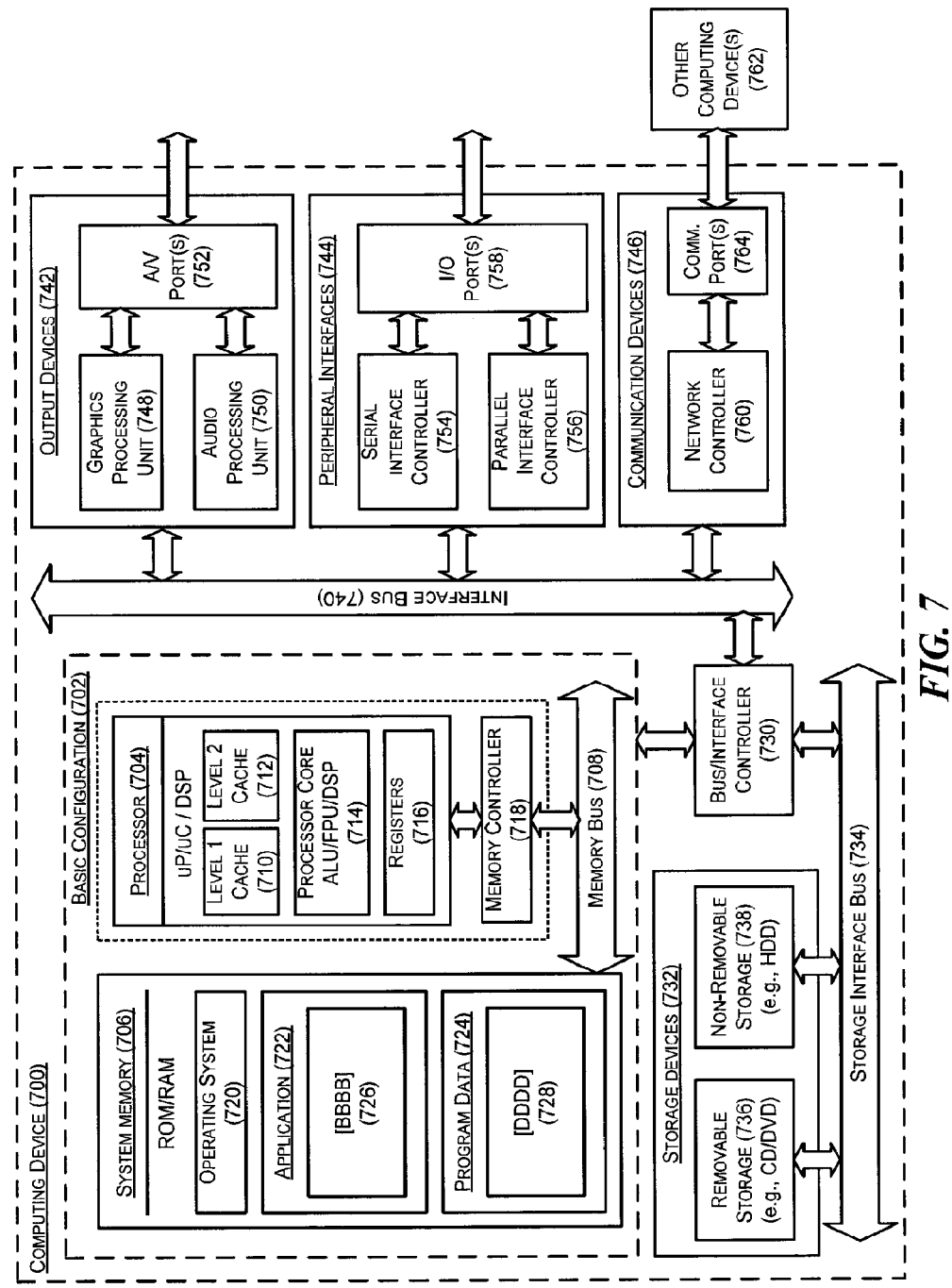
FIG. 7 is a block diagram of an illustrative embodiment of a computing device that is arranged for disabling a rotation function in accordance with at least some embodiments of the present disclosure.
Figure 4:
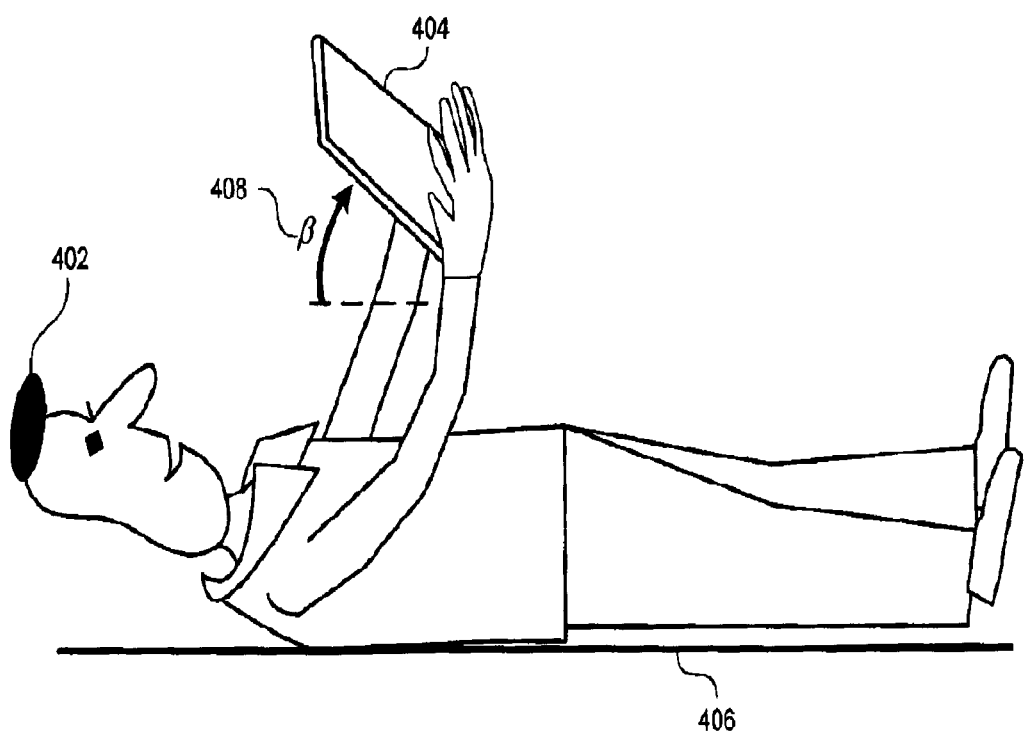
Figure 7:
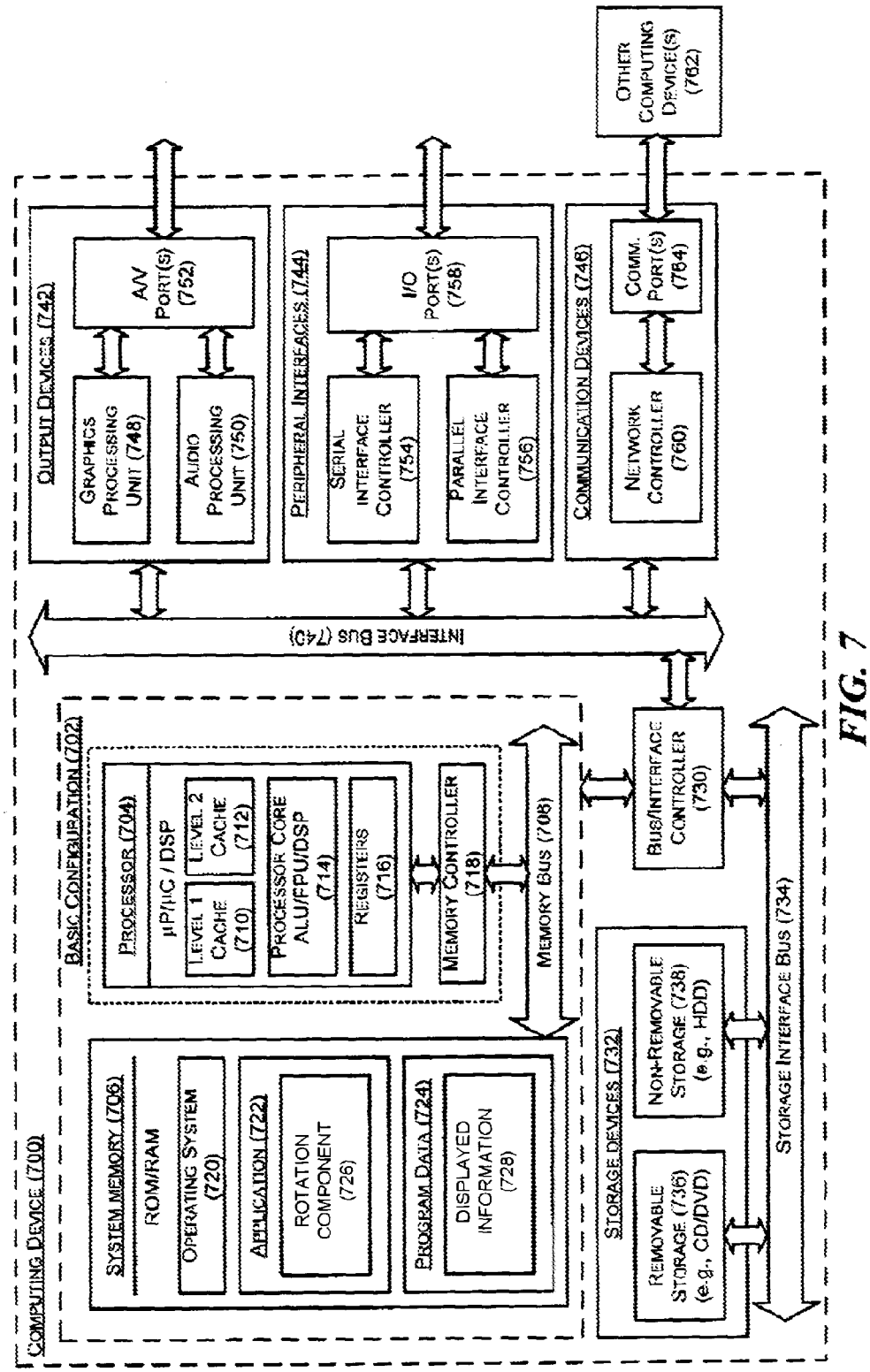

FIG. 7 is a block diagram illustrating an example computing device 700 that is arranged for disabling a rotation function in accordance with at least some embodiments of the present disclosure. In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor (µP), a microcontroller (µC), a digital signal processor (DSP), or any combination thereof. Processor 704 may include one more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, one or more applications 722, and program data 724. Application 722 may include a rotation component 726 that is arranged to enable or disable the rotation function. Program data 724 may include displayed information 728 that may be useful while rotating the displayed information, as is described herein. In some embodiments, application 722 may be arranged to operate with program data 724 on operating system 720 such that rotation of displayed information is enabled or disabled, e.g., depending on an orientation of the display. This described basic configuration 702 is illustrated in FIG. 7 by those components within the inner dashed line.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

In various embodiments, the technology implements a method performed by a computing device having a processor and memory, comprising: detecting a tilt angle of a display of the computing device in relation to a surface; and if the tilt angle is less than a specified threshold tilt angle, disabling a rotation function. The method can further comprise enabling the rotation function if the tilt angle is equal to or more than the specified threshold tilt angle. The method can further comprise detecting includes receiving a signal from a sensor indicating the tilt angle. The detecting can include receiving a signal from an accelerometer indicating the tilt angle or receiving a signal from a sensor that measures motion in at least three axes. The method can further comprise enabling the rotation function if a rotation switch is activated wherein the activated rotation switch overrides disabling the rotation function. The threshold tilt angle can be approximately equal to ninety degrees. The method can further comprise determining whether the display of the computing device is being viewed by a user while the user is situated in a supine position on the surface.

In various embodiments, the technology can include a computer-readable storage device storing computer-executable instructions, the instructions comprising: detecting a tilt angle of a display of a computing device in relation to a plane; and if the tilt angle is less than a specified threshold tilt angle, disabling a rotation function. The instructions can further comprise determining whether the display of the computing device is being viewed by a user while the user is situated in a supine position on the surface. The instructions can further comprise detecting includes querying a sensor for the tilt angle. The detecting can include querying a six-axis sensor and receiving information indicating the tilt angle.

In various embodiments, the technology is implemented by a system for detecting whether to disable a rotation function of a computing device having a processor, memory, and a display, comprising: a sensor configured to detect a tilt angle of a display surface in relation to a plane; and a component configured to disable a rotation function of the computing device if a difference between the tilt angle and a specified threshold tilt angle exceeds a specified value. The plane can be perpendicular to a force of gravity. The sensor is an accelerometer, e.g., a six-axis accelerometer. The plane can be a surface on which a user views the display while the user is in a supine position. The system can further comprise a rotation switch that, if actuated, overrides the component configured to disable rotation. The system can further comprise one or more means for computing the difference between the tilt angle and the specified threshold tilt angle. The system can further comprise one or more means for disabling the rotation function. The sensor can be a gyroscopic sensor.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

I claim:

1. A system for detecting whether to disable a rotation function of a computing device having a processor, memory, and a display, comprising:
    a sensor configured to detect a tilt angle of a display surface in relation to a plane; and
    a component configured to disable a rotation function of the computing device if a difference between the tilt angle and a specified threshold tilt angle exceeds a specified value.

2. The system of claim 1 wherein the plane is perpendicular to a force of gravity.

3. The system of claim 1 wherein the sensor is an accelerometer.

4. The system of claim 1 wherein the sensor is a six-axis accelerometer.

5. The system of claim 1 wherein the plane is a surface on which a user views the display while the user is in a supine position.

6. The system of claim 1 further comprising a rotation switch that, if actuated, overrides the component configured to disable rotation.

7. The system of claim 1 further comprising means for computing the difference between the tilt angle and the specified threshold tilt angle.

8. The system of claim 1 further comprising means for disabling the rotation function.

9. The system of claim 1 wherein the sensor is a gyroscopic sensor.

10. The system of claim 1 wherein the sensor provides an indication of an angle between the plane and a direction of gravity.

* * * * *

UNITED STATES PATENT AND TRADEMARK OFFICE
CERTIFICATE OF CORRECTION

PATENT NO. : 8,427,427 B2
APPLICATION NO. : 13/123450
DATED : April 23, 2013
INVENTOR(S) : Kim It is certified that error appears in the above-identified patent and that said Letters Patent is hereby corrected as shown below:

On the Title Page, in Item (56), under "OTHER PUBLICATIONS", in Column 2, Line 2, delete "com/ , 6 pages." and insert -- com/, 6 pages. --, therefor.

On the Title Page, in Item (56), under "OTHER PUBLICATIONS", in Column 2, Line 4, delete "Line." and insert -- Line, --, therefor.

On the Title Page, in Item (56), under "OTHER PUBLICATIONS", in Column 2, Line 6, delete "mobile. Nov. 6, 2008. 1 page." and insert -- mobile, Nov. 6, 2008, 1 page. --, therefor.

On the Title Page, in Item (56), under "OTHER PUBLICATIONS", in Column 2, Line 11, delete "Features." and insert -- Features, --, therefor.

On the Title Page, in Item (56), under "OTHER PUBLICATIONS", in Column 2, Line 13, delete "Symposium." and insert -- Symposium, --, therefor.

Title Page 2, in Item (56), under "OTHER PUBLICATIONS", in Column 1, Line 1, delete "Recognition." and insert -- Recognition, --, therefor.

Title Page 2, in Item (56), under "OTHER PUBLICATIONS", in Column 1, Line 2, delete "2009." and insert -- 2009, --, therefor.

Title Page 2, in Item (56), under "OTHER PUBLICATIONS", in Column 1, Line 4, delete "Review]." and insert -- Review], --, therefor.

Title Page 2, in Item (56), under "OTHER PUBLICATIONS", in Column 1, Line 6, delete "Review." and insert -- Review, --, therefor.

Title Page 2, in Item (56), under "OTHER PUBLICATIONS", in Column 2, Lines 1-2, delete "Lock. Mar. 12, 2010." and insert -- Lock, Mar. 12, 2010, --, therefor.

Signed and Sealed this
Twentieth Day of August, 2013

Teresa Stanek Rea
*Acting Director of the United States Patent and Trademark Office*

CERTIFICATE OF CORRECTION (continued)
U.S. Pat. No. 8,427,427 B2

Title Page 2, in Item (56), under "OTHER PUBLICATIONS", in Column 2, Line 4,
delete "Haar-like. Wavelet Features. Jul. 9, 2008." and
insert -- Haar-like, Wavelet Features, Jul. 9, 2008, --, therefor.

In the Drawings:

Delete fig. 4 and substitute the attached fig. 4 therefor.

Delete fig. 7 and substitute the attached fig. 7 therefor.

In the Specifications:

In Column 5, Line 19, delete "(HDD)," and insert -- (HDDs), --, therefor.

In Column 5, Line 21, delete "(SSD)," and insert -- (SSDs), --, therefor.

In Column 5, Line 31, delete "(DVD)" and insert -- (DVDs) --, therefor.